United States Patent
Kim et al.

[11] Patent Number: 5,651,182
[45] Date of Patent: Jul. 29, 1997

[54] SAW FOR CUTTING NEAR BARRIERS

[76] Inventors: Jack T. B. Kim, 1748 Flickinger Ave., San Jose, Calif. 95131; Robert W. Strickler, 1606 Honeysuckle Dr., San Jose, Calif. 95122

[21] Appl. No.: 348,364

[22] Filed: Nov. 30, 1994

[51] Int. Cl.$^6$ .................................................. B23D 45/16
[52] U.S. Cl. .................................................. 30/373; 30/390
[58] Field of Search ........................... 30/376, 373, 374, 30/388, 390, 391

[56] References Cited

U.S. PATENT DOCUMENTS

| | | | |
|---|---|---|---|
| 2,352,432 | 6/1944 | Harrington | 30/374 X |
| 2,714,905 | 8/1955 | Chayton | 30/374 |
| 3,356,111 | 12/1967 | Mitchell | 143/36 |
| 4,135,419 | 1/1979 | Chapin | 83/471.3 |
| 4,598,744 | 7/1986 | Bons et al. | 144/1 G |
| 4,873,766 | 10/1989 | Johnston | 30/388 |
| 5,398,456 | 3/1995 | Kleider | 30/371 |

*Primary Examiner*—Douglas D. Watts
*Attorney, Agent, or Firm*—Michael J. Hughes; Bradley T. Sako

[57] ABSTRACT

A saw assembly (10) for sawing portions of a floor (24) adjacent to a vertical wall (26) and below and overhang (28) including a blade driving subassembly (12) having housing (30) with a forward extending, low profile saw arm (52). The housing holds a trigger switch (36), an electric motor (32) and a drive shaft (34) with a threaded saw attachment end (62). The saw attachment end (62) extends beyond a rest ting (56) on the distal end of the saw arm (52). The electric motor (32) drives a blade subassembly (12) including a circular blade (66), a blade collar (65), and a locking nut (64) which are attached to the saw attachment end (62). The blade driving subassembly (14) is attached to a floor plate subassembly (18). A blade guard (22) covers a portion of the circular saw (66) exposing a downwardly extending cutting portion (76). An outrigger subassembly (16) includes two outrigger arms (116) which lock into an outwardly extending position, contacting a floor (24). The outrigger subassembly (16) resists any rotational movement translated to the blade driving subassembly (14) by torque generated from cutting resistance to the circular blade (66).

9 Claims, 5 Drawing Sheets

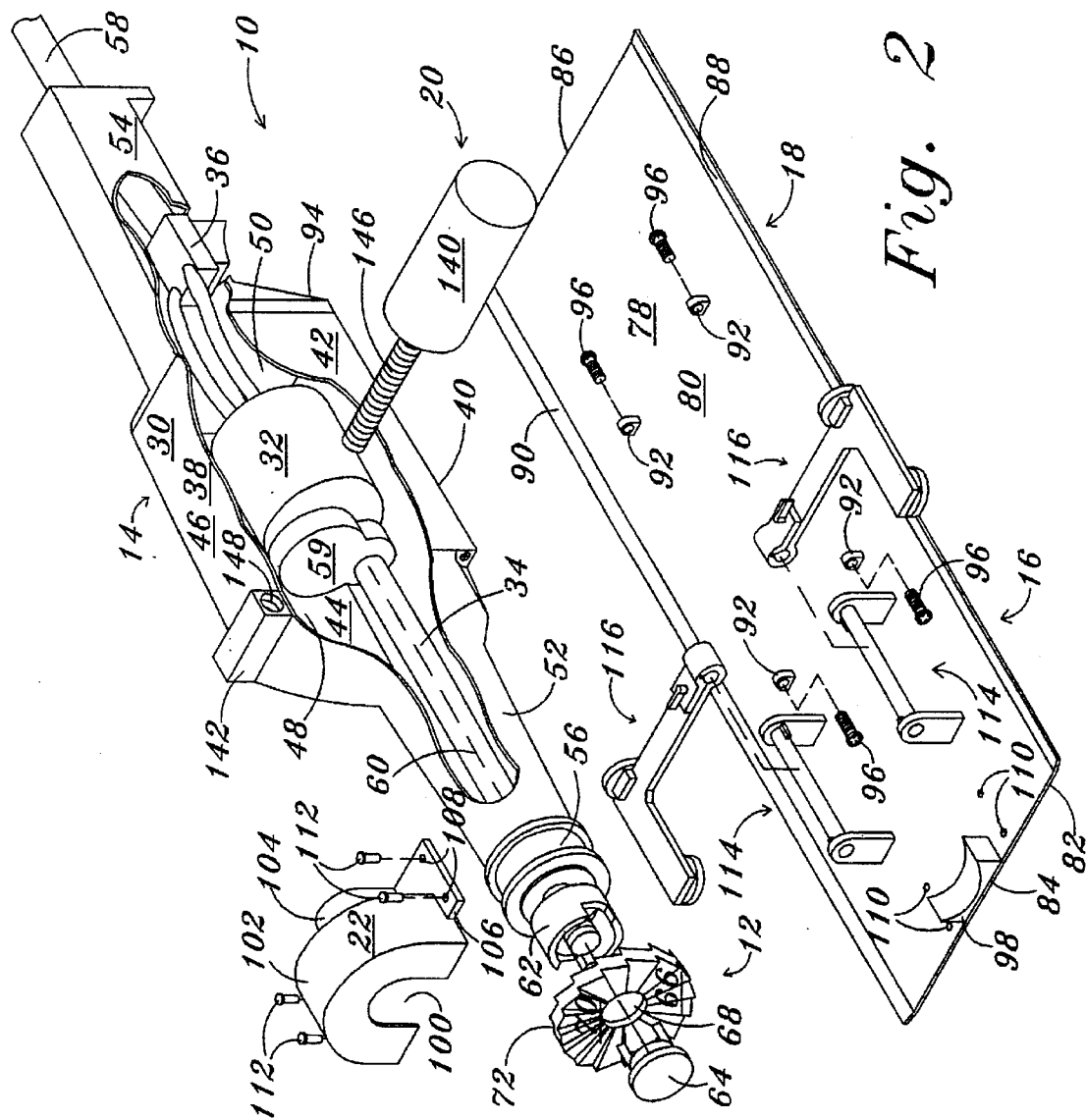

SAW FOR CUTTING NEAR BARRIERS

TECHNICAL FIELD

The present invention relates generally to the field of cutting devices, and more particularly to portable circular sawing devices for cutting at locations that are near barriers or under close overhanging surface.

BACKGROUND ART

As houses change owners, interior decorating styles come and go, and time takes its toll on structural integrity, remodeling a home becomes a matter of great importance to a home owner.

One of the great challenges of remodeling a home involves the close quarters cutting of structures close to barriers. One common situation is the need to cut away flooring where it intersects a wall, particularly if an overhanging object is present, such as a cabinet. Present procedures typically require the removal of the entire cabinet in order to get a cut close to the wall, the alternatives being to do a poor job or to proceed in a very tedious manual fashion to remove existing flooring. All of these methods can be time consuming and expensive. In addition, present art systems, due to a lack of precision, can damage the underlying floor.

A number of sawing devices are present in the prior art. U.S. Pat. No. 4,135,419 issued to Everett E. Chapin on Jan. 23, 1979 presents a sawing guide for a circular saw. Unfortunately, the device is not suitable for reaching under structures, as the saw that is adapted to be mounted within the guide is bulky. In addition, the sliding panel prevents the saw from getting close to a vertical barrier, such as a wall. While the saw of Chapin is adapted to slide, the travel of the saw is limited to the length of the opposing channels within the arms. A thorough examination of Chapin shows that the sawing device and process set forth address the sawing of a work piece, making it unsuitable for cutting into a floor structure.

Two less relevant references are presented by U.S. Pat. No. 3,356,111 issued to Walter G. Mitchell on Dec. 5, 1967, and U.S. Pat. No. 4,598,744 issued to Bons et al. on Jul. 8, 1986. The Mitchell patent presents a more compact power tool arrangement, including a circular saw structure. Because the structure is adapted for use with a machining table, it is unsuitable for reaching under and sawing close to barriers.

Bons et al. provides a universal machine that includes a pivoting turning device which can also be raised and lowered in a range of vertical positions. The universal machine is a relatively large structure, and the mining device centrally located, making it also unsuitable for cutting close to barriers.

To the inventors' knowledge, no apparatus has been created to meet the needs required for the close-quarters, edge cutting of floors. All concepts for such means which have been advanced have been either too bulky to fit in the tight working quarters or have not been able to cut at a close enough proximity to the barrier.

SUMMARY OF INVENTION

Accordingly, it is an object of the present invention to provide a cutting device that provides a cutting edge close to a barrier.

It is another object of the present invention to provide a cutting device that can cut a floor underneath an overhang.

It is still another object of the present invention to provide a cutting device for cutting a floor that remains stable under operation.

It is yet another object of the present invention to provide a cutting device that provides a stable operator gripping arrangement.

Briefly, the preferred embodiment of the present invention is a saw assembly for cutting the portion of a floor under an overhang and adjacent to a vertically extending wall. The preferred embodiment includes a circular slitting blade, a drive shaft, an electric motor, and a housing. The blade and the drive shaft are disposed about a rotational axis. The housing includes a handle, a central portion, and an arm portion. The central portion houses the motor and the drive shaft extends from within the central portion through the arm portion and terminates in a threaded attachment end. The saw is attached to the end of the drive shaft by a locking nut and blade collar arrangement that tighten in the direction of rotation of the saw. The arm portion of the housing projects outward from the central portion, and when taken along the rotational axis, has a cross section considerably smaller than the central portion. The handle extends from the central portion in a direction opposite to the arm portion, and includes a trigger switch for providing power to the motor.

The preferred embodiment also includes a ground engaging floor plate. The floor plate has a generally rectangular shape, having a left side, a right side, a front side, and a rear side. A right, lockable stabilizing arm swings outward from the right side and a corresponding left, lockable stabilizing arm swings outward from the left side. The housing is attached to the floor plate between the stabilizing arms so that the rotational axis is parallel to the floor plate with the handle portion and arm portions extending above the floor plate. The arm portion extends over the front side with blade positioned beyond the front side with a portion extending below the level of the floor plate. The portion of the blade below the floor plate is the cutting portion of the blade under operation. A blade guard, attached to the floor plate, covers the non-cutting portion of the blade. A second handle can be removably attached to the housing to provide a grip which is suspended above the housing, perpendicularly to the rotational axis.

The narrow arm portion allows the preferred embodiment to be positioned under cabinets or other overhanging barriers with the blade guard against the wall. Once in position, the motor of the preferred embodiment can be engaged which, in turn, rotates the blade. The blade is then lowered into the floor and the entire saw assembly moved along the floor with the blade guard in continuous contact with the wall. Further, the floor plate protects the operator's hands from rubbing the floor as the saw assembly is moved along.

An advantage of the present invention is that it provides a cutting device which protects the hands of the operator.

Yet another advantage of the present invention is that is provides a cutting device for cutting adjacent to vertical barriers that is easy to use.

These and other objects and advantages of the present invention will become clear to those skilled in the art in view of the description of the best presently known mode of carrying out the invention and the industrial applicability of the preferred embodiment as described herein and as illustrated in the several figures of the drawing.

BRIEF DESCRIPTION OF THE DRAWING

FIG. 2 is a fanciful exploded view of the preferred embodiment, with a partially cut away view of the blade driving subassembly;

BEST MODE FOR CARRYING OUT INVENTION

Figure 1:
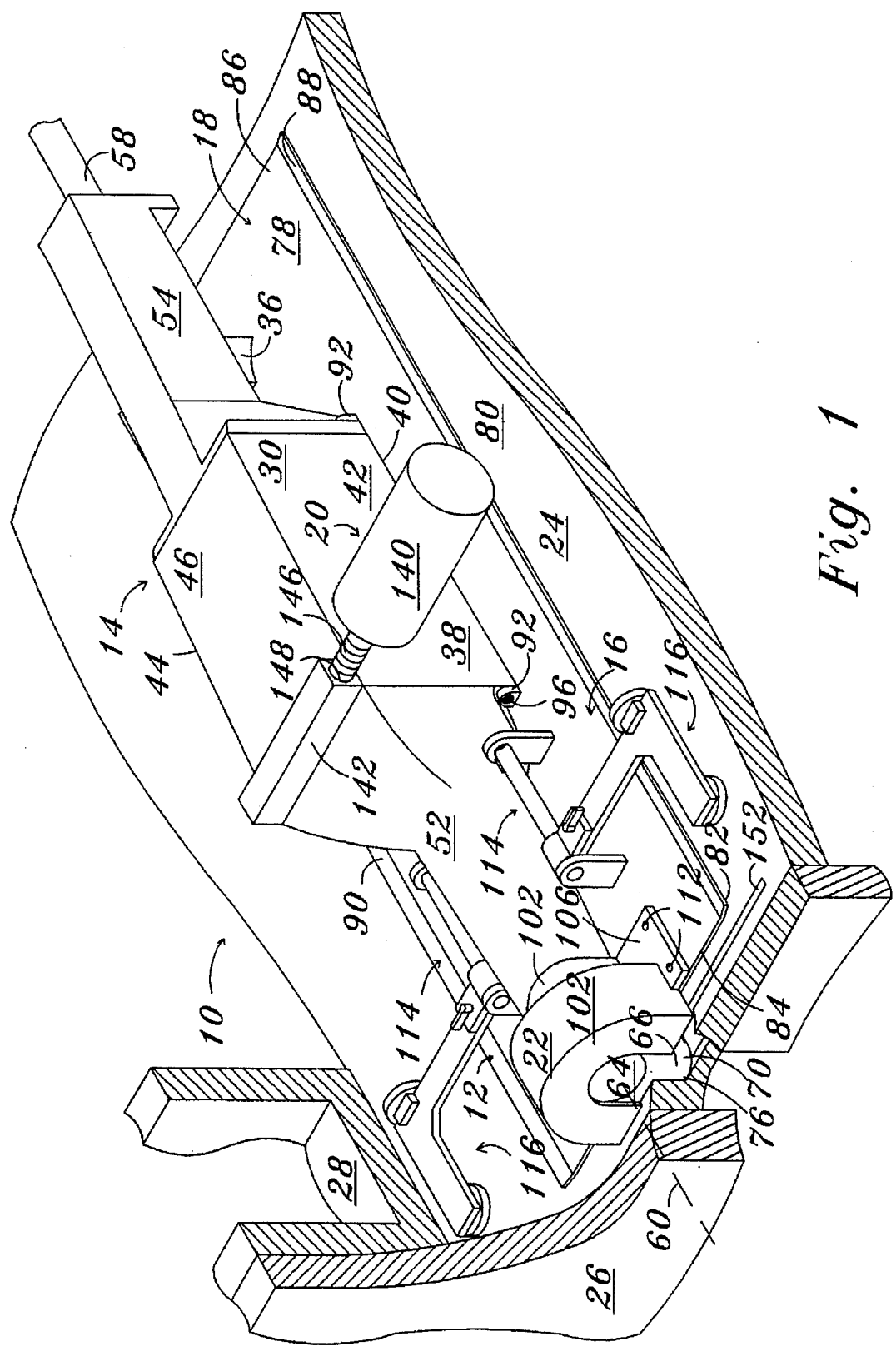
FIG. 1 is an isometric view of the preferred embodiment including a cut away view of a typical working environment.

The best presently known mode for carrying out the invention is saw assembly for cutting close to barriers and is illustrated in an isometric view in FIG. 1 and designated by the general reference character 10.

The best presently known mode for carrying out the invention 10, as set forth in FIG. 1, includes a blade subassembly 12, a blade driving subassembly 14, an outrigger subassembly 16, a floor plate subassembly 18, a top handle subassembly 20, and a blade guard 22. The entire saw assembly 10 is adapted to lie on a horizontal floor 24 with the blade subassembly 12 and the blade driving subassembly 14 adjacent to a vertically extending wall 26 and below an overhang 28 (in this example a cabinet).

The various components of the preferred embodiment 10 are set forth in more detail in the fanciful exploded view of FIG. 2. Referring now to FIGS. 1 and 2, the blade driving subassembly 14 includes a surrounding outer housing 30, an electric motor 32, a drive shaft 34, and a trigger switch 36. The housing 30 is a hard plastic shell structure and includes a central portion 38 having a bottom surface 40, a first side surface 42, a second side surface 44, and a top surface 46. In addition, the central portion 38 opens into a front housing opening 48 and an opposing rear housing opening 50. One skilled in the art would recognize that the shape and material of the housing 30 can vary. Just some of the possible variations could be a housing 30 composed of cast metal, or a combination of cast metal and plastic.

Figure 3A:
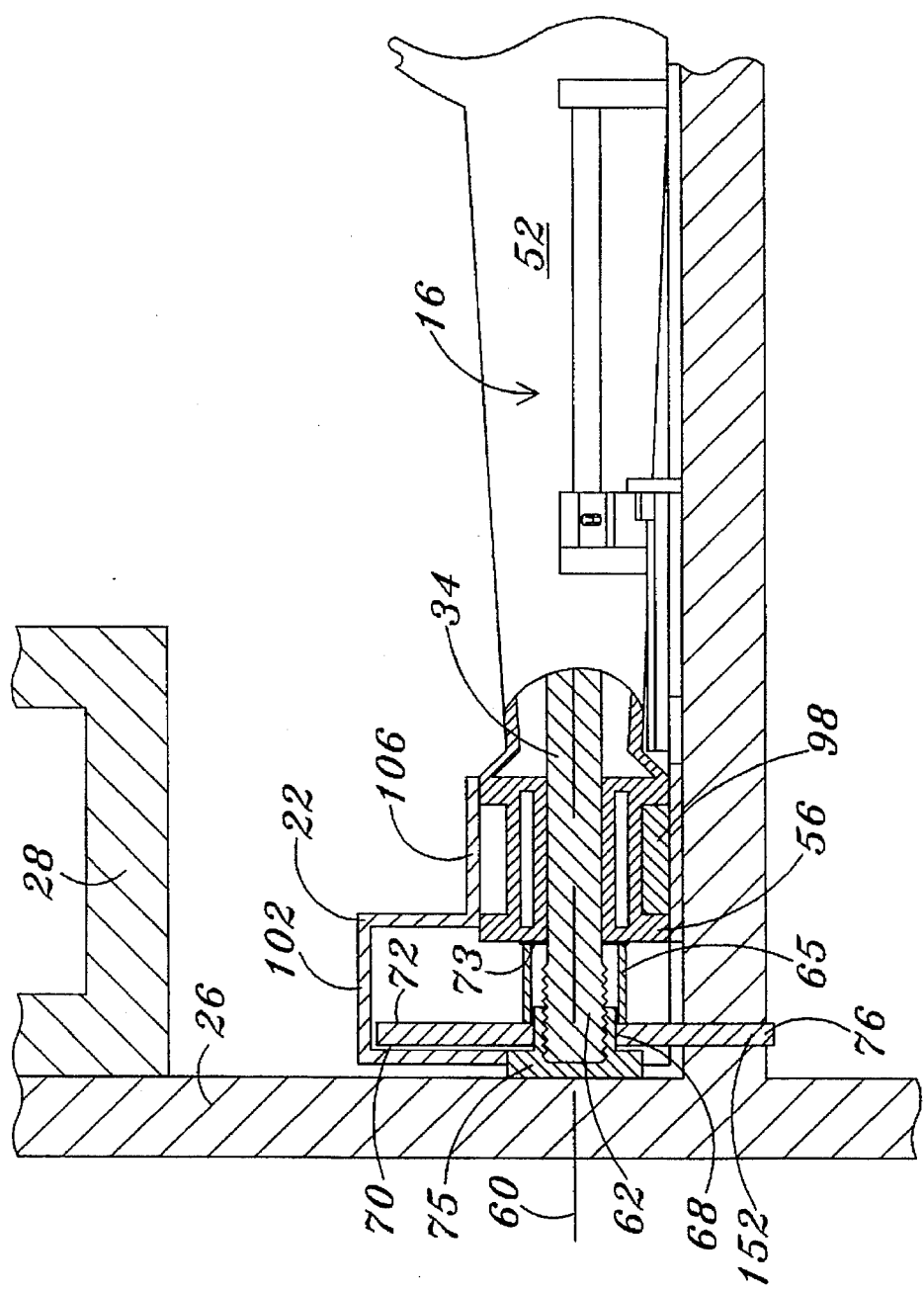
FIG. 3A is a side view of a portion of the preferred embodiment in operation, including a partial cross sectional view.
Figure 3B:
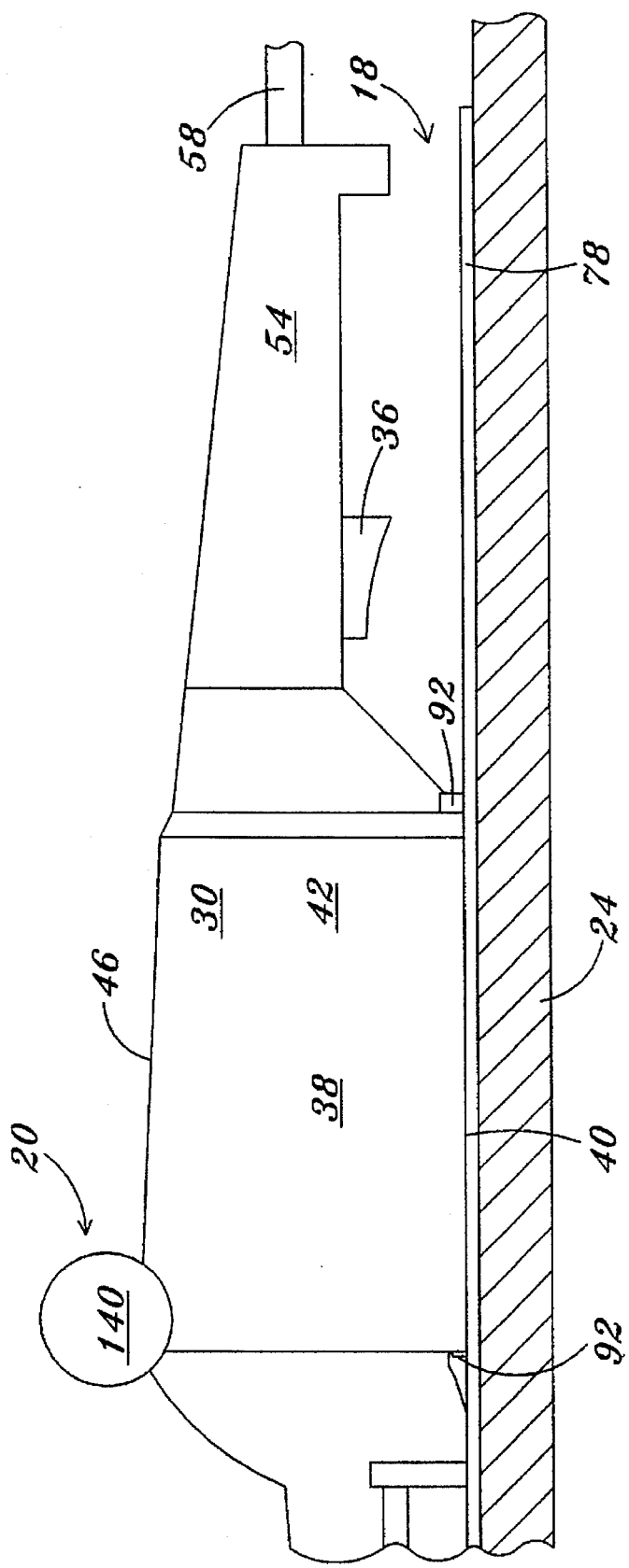
FIG. 3B is a side view of a portion of the preferred embodiment.

As shown in FIGS. 1 and 2, and further set forth in FIGS. 3A and 3B, the housing 30 further includes a hollow saw arm 52 that extends forward from the front housing opening 48. Opposite to the saw arm 52, a trigger handle 54 extends rearward from the rear housing opening 50. The trigger handle 54 is designed to project from the central portion 38 above the floor plate assembly 18. This allows an operator's hand to easily grasp the trigger handle 34 when the saw assembly 10 is in operation. While the preferred embodiment 10 sets forth a trigger handle 54 of a certain shape, the inventors' anticipate a variety of variations on handle design. Just one such example would be a trigger handle 54 extending upward to a sufficient extent, so as to allow the present invention to be operated while standing up. This configuration would also be applicable for working on ceilings.

The saw arm 52 is positioned slightly above the floor plate assembly 18, and as is best shown in FIG. 3A, in its entirety, is disposed close to the floor plate assembly 18 and the floor 24. The saw arm 52 has a smaller vertical dimension than the remainder of the housing 30. This gives the saw arm 52 a "low profile". In addition to having a low profile, the saw arm 52 projects substantially forward from the central portion 38. This arrangement enables the saw assembly 10 to "reach" under overhangs 28, as is illustrated in FIGS. 1 and 3A. The saw arm 52 terminates in a short, cylindrical, rest ring 56.

As set forth in the partially cut away view of FIG. 2, the central portion 38 contains the electric motor 32. In the preferred embodiment 10 the electric motor 32 is connected to, and controlled by, the trigger switch 36 which is positioned within the trigger handle 54. The trigger switch 36 extends downward from the trigger handle 54 and is positioned towards the central portion 38, as is shown in FIG. 3B. Power is provided to the preferred embodiment 10 through the trigger switch 36 by a power cord 58. The preferred embodiment 10 is adapted to receive a standard line voltage of 120 volts ac.

In the preferred embodiment 10, the drive shaft 34 is coupled to the electric motor 32 by a gear assembly 59. The gear assembly 59 imparts rotational movement from the electric motor 32 to the drive shaft 34, and also enables the drive shaft 34 to be disposed as close to the ground as possible within the housing 30. As illustrated in FIG. 3A, the drive shaft 34 extends through, and out of, the saw arm 52 of the housing 30 along a rotational axis 60. As set forth in FIGS. 2 and 3A, the housing 30 and the electric motor 32 are adapted so as to position the drive shaft 34 parallel to the floor plate subassembly 18, and when under operation, parallel to the floor 24 as well. As further set forth in the figures, the drive shaft 34 includes a threaded saw attachment end 62 which projects from the saw arm 52 from out of the rest ring 56. The housing 30 is designed to allow the drive shaft 34 to rotate freely when powered by the electric motor 32. The threading on the saw attachment end 62 is designed, in conjunction with the orientation of the electric motor 32, to turn in a tightening direction when the saw assembly 10 is under power.

Referring again to the fanciful exploded view of FIG. 2, the components of the blade subassembly 12 of the preferred embodiment 10 are illustrated. The blade assembly 12 includes a locking nut 64, a blade collar 65, and a circular, side cutting, slitting blade 66. The circular blade 66 has a central threaded attachment aperture 68, a front blade face 70, and a rear blade face 72. The blade collar 65 is an annular structure that is situated between the saw arm 52 and the circular blade 66, with the drive shaft 34 extending therethrough. The circular blade 66 is situated on the attachment end 68 of the drive shaft 34, between the blade collar 65 and the locking nut. As illustrated in FIG. 3A, the locking nut 64 is threaded onto the attachment end 68 and through the circular blade 66. The locking nut 64 engages the circular blade 66, preventing it from slipping under operation The shape of the blade collar 65 and the locking nut 64 ensure that the circular blade 66 is disposed perpendicular to the rotational axis 60 with the rear saw face 72 opposing the saw arm 52 of the housing 30. The blade collar 65 rests on a bushing 73 which allows the blade collar 65 to rotate freely with the circular blade 66 and the locking nut 64 when the preferred embodiment 10 is cutting.

Referring now to FIGS. 2 and 3A, the locking nut 64 is shown to have a central, threaded stop aperture 74, and a disk shaped nut head 75. The threaded stop aperture 74 receives the saw attachment end 62 and when tightened, forces the nut head 75 against the circular blade 66, which in turn, is forced against the blade collar 65.

As is best set forth in FIG. 3A, the attachment end 62 extends beyond the floor plate subassembly 18 ensuring that a cutting portion 76 of the circular blade 66 can extend below the floor plate sub assembly 18, and into the floor 24 when the floor plate subassembly 18 is on the floor 24. It is understood that for the purposes of this description, the cutting portion 76 is that portion of the circular blade 66 that extends into the floor 24 as the circular blade 66 is rotating.

The floor plate subassembly 18 is best illustrated in FIG. 2. As shown in the figure the floor plate subassembly 18 includes a flat, rigid plate member 78 having a top plate surface 80 and a bottom plate surface 82. In the preferred embodiment 10, the plate member 78 is rectangular in shape, being defined by a front edge 84, a rear edge 86, a first flared edge 88, and a second flared edge 90. The first and second flared edges (88 and 90) are each turned upward and are longer in dimension than the front and rear edges (84 and 86). The flat bottom plate surface 82 contacts the floor 24 and allows the entire saw assembly 10 to slide along the floor 24 as it is used.

While the preferred embodiment 10, uses a smooth bottom plate surface 78 as a sliding member, it is understood that a number of other sliding designs may be employed. Just a few of the possible variations could be a graphite or TEFLON® coated bottom plate surface 78, or a plate member 78 having a number of wheels or cam followers. It is also understood that the plate member 78 is not a critical element of the present invention. For applications where working spaces cause the plate member 78 to hamper operation, the plate member 78 may be removed.

The blade driving subassembly 14 of the preferred embodiment 10 is attached to the floor plate subassembly 18. The preferred attachment method is best illustrated in FIG. 2. As shown in the figure the plate member 78 includes four attachment eyelets 92 which project upward from the top plate surface 80. Correspondingly, the bottom surface 40 of the housing central portion 38 includes four housing apertures 94 (only two housing apertures 94 are shown in the figures). The housing apertures 94 are horizontally disposed and situated so that when the blade driving subassembly 14 is placed on the plate member 78, with the housing bottom surface 40 engaging the top plate surface 80, the four housing apertures 94 can be aligned with the four attachment eyelets 92. Four attachment screws 96 are threaded through the eyelets 92 into the housing apertures 94, securing the blade driving subassembly 14 to the floor plate subassembly 18, as illustrated in FIGS. 1 and 3B.

The floor plate subassembly 18 also includes a support collar 98, as set forth in FIG. 2. The support collar 98 is an arcuate structure that is aligned with the front edge 84 of the plate member 78 and curved to receive the rest ring 56 of the saw arm 52. The support collar 98 is positioned so that when the blade driving subassembly 14 is secured to the plate member 78, the rest ring 56 engages the support collar 98. As shown in FIG. 3A, the support collar 98 helps support the saw arm 52 above the plate member 78, with the matching curved shape of the support collar 98 also eliminating any side-to-side motion of the saw arm 52.

The saw assembly of the preferred embodiment 10 includes a number of unique safety features. Among these features is the blade guard 22. As shown in FIG. 2, the blade guard 22 is an integral structure that includes a nut slot 100, a blade cover 102, a rest cover 104, and a securing plate 106 with four guard holes 108 (only two guard holes are shown in FIG. 2). Also set forth in FIG. 2 are four securing holes 110 in the plate member 78, two on each side of the support collar 98. The securing holes 110 are spaced to correspond to the four guard holes 108. The blade guard 22 is attached to the plate member 78 with the securing plate 106 atop the top plate surface 80 and the guard holes 108 aligned with the securing holes 110. As shown in FIG. 2, four rivets 112 pass through corresponding guard and securing holes (108 and 110), riveting the blade guard 22 in place.

The orientation of the blade guard 22 with respect to the blade subassembly 12 and blade driving subassembly 14 is best illustrated in the cross section of FIG. 3A. Once secured to the plate member 78, the locking nut 64 is positioned within the nut slot 100, and the blade cover 102 surrounds part of the circular blade 66 leaving the cutting portion 76 exposed, while the rest cover 104 surrounds the rest ring 56. In this manner, the majority of the rotating parts of the saw assembly 10 (the drive shaft 34, blade collar 65, locking nut 64, and the circular blade 66) are completely covered, leaving only the critical cutting portion 76 of the circular blade 66 exposed. This minimizes accidental operator contact with circular blade 66, prevents machined particles from flying out from the circular blade 66, and prevents the circular blade 66 from accidentally damaging the overhang 28.

Figure 4:
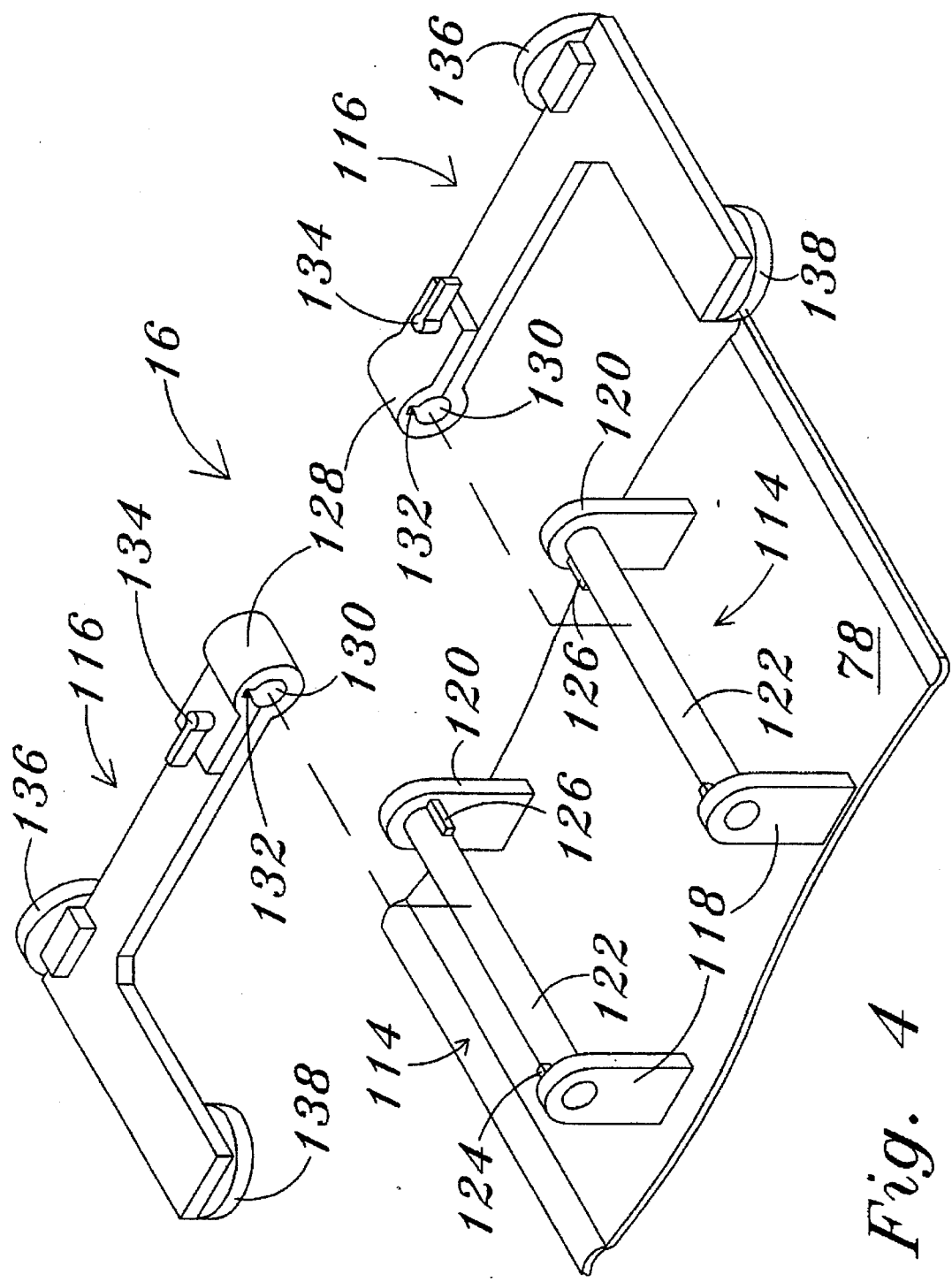
FIG. 4 is a fanciful exploded view of the outrigger assembly of the preferred embodiment.

A second safety feature is presented by the outrigger subassembly 16 of the preferred embodiment 10. The present inventors have found that when the saw assembly 10 encounters cutting resistance, torque can be translated back into the blade driving sub assembly 14, causing it rotate. While the floor plate subassembly 18 provides a flat surface to prevent this unwanted torque, additional stability is provided by the outrigger subassembly 16. As shown in FIG. 2, and best illustrated in FIG. 4, the outrigger subassembly 16 includes a pair of mirror image outrigger bar structures 114 and outrigger arms 116. As shown in FIG. 4, the outrigger bar structures 114 include a front post 118, a rear post 120 and a bar 122. The bar 122 is disposed horizontally between the front and rear posts (118 and 120), parallel to the rotational axis 60. Each bar 122 is cylindrical, and includes a vertically disposed front tooth 124 and a horizontally disposed rear tooth 126. As is evident in the figures, the outrigger arms 116 are each "L" shaped, and include an arm collar 128 having a bar aperture 130 with a tooth slot 132, a ratchet handle 134, an elbow bumper 136, and a front bumper 138. The outrigger arms 116 are attached to the outrigger bar structures 114 by the arm collar 128. The arm collar 128 surrounds the bar 122 so that the bar 122 passes through the bar aperture 130. The tooth slot 132 of each bar aperture 130 is adapted to engage either the front tooth 124 or the rear tooth 126 of the bar 122. The tooth slot 132 is brought to engage the front tooth 124 by sliding the outrigger arm 116 forward so that the tooth slot 132 is aligned with, and slides over the front tooth 124. The ratchet handle 134 is tightened, cinching the arm collar 128, and preventing any further sliding movement of the outrigger arm 116. When both outrigger arms 166 are in this position the outrigger arms 116 are deployed on either side of the floor plate subassembly 18 in a roughly horizontal position, with the elbow and front bumpers (136 and 138) extending beyond the plate member 78 and contacting the floor 24, as illustrated in FIGS. 1 and 3A. Any movement caused by unwanted torque of the blade driving subassembly 14 is prevented by the outrigger arms 116. The outrigger arms 116 can be deployed in a second position by loosening the ratchet handles 134, and sliding the outrigger arms 166 backward along the bars 122, and rotating the outrigger arms 166 into a vertical position, allowing the tooth slots 132 to slip over the rear teeth 126. Once the ratchet handles 134 are tightened, the outrigger arms 116 are locked in a vertical position.

While the preferred embodiment 10 illustrates outrigger assemblies of a particular design, it is understood that the stabilization effect could be accomplished by a variety of alternate designs deploying members which extend outward from the housing 30 or floor plate subassembly 78. Just one such example would be a pair of outwardly deployable, pantograph-like, double diamond collapsible frame members.

Additional operational control of the saw assembly 10 is provided by the top handle subassembly 20. The various components of the top handle subassembly 20 of the preferred embodiment 10 are illustrated in FIGS. 1, 2, and 3b, and include a grip 140, a handle block 142, two clamp screws 144, and a handle bar 146. The handle block 142, as set forth in FIGS. 1 and 3B, and in cross section in FIG. 2, is attached to the top surface 46 of the housing 30, and has the shape of a long rectangular block disposed perpendicularly to the rotational axis 60. A threaded handle aperture 148 extends through the entire handle block 142 and is also perpendicular to the rotational axis 60. The handle bar 146 is a straight, cylindrical, threaded structure that ends in the grip 140. The handle bar 146 is threaded into the handle aperture, as shown in FIGS. 1 and 3B. As best shown in FIG. 1, the grip 140 is designed to be perpendicular to both the rotational axis 60 and the trigger handle 54 of the housing 30. The vertical position of the grip 140 and the perpendicular arrangement of the grip 140 with respect to the trigger handle 54, provides for a more secure and stable handling arrangement of the saw assembly 10 during operation. The handle bar 146 is deployed generally toward the circular blade 66. This has been found to provide better control of the preferred embodiment 10.

Having described the components of the preferred embodiment 10, attention is now directed to the anticipated mode of operation for the saw assembly 10. FIGS. 1 and 3A convey a typical working environment of the saw assembly 10 and also depict the horizontally disposed floor 24, the vertically disposed wall 26, and the overhang 28. As the preferred embodiment 10 is intended to remove the floor 24, it is desirable to get a cut on the floor 24 as close to the wall 26 as possible. The vertical spacing between the floor 24 and the overhang 28 presents constraints on accessing the portion of the floor 24 that is adjacent to the wall 26.

To create a cut 152 adjacent to the wall 26 with the present invention 10, the outrigger arms 116 are first deployed in the horizontal position. The saw assembly 10 is then moved next to the wall with the saw arm 52 assembly extending under the overhang 28. The blade guard 22 is brought into contact with the wall 26 so that the circular blade 66 is parallel to the wall 26 with the circular blade 66 just resting on the floor 24.

To begin cutting the floor 24 with the saw assembly 10, the saw assembly 10 is held by the operator with one hand on the grip 140 and the other on the trigger handle 54. The trigger switch 56 is activated which provides rotational movement to the circular blade 66. As the cutting portion 76 of the circular blade 66 cuts into the floor 24, the entire saw assembly 10 is then lowered until the plate member 78 is flush against the floor 24. To complete the cut 152, the entire saw assembly 10, with the circular blade 66 engaging the floor 24, is moved parallel to the wall 26 until the desired length of the cut 152 is completed. It is noted that the portion of the plate member 78 below the trigger handle 54 protects the operator's hand from rubbing against the floor 24 as the saw assembly 10 is utilized. FIGS. 1 and 3A illustrate the typical cut 152 created by the preferred embodiment 10.

Various modifications may be made to the invention without altering its value or scope. One skilled in the art would recognize that the shape of the housing 30 may vary substantially, provided that the saw arm 52 projects outward in one direction, at vertical height low enough to reach under overhanging barriers. The type and orientation of the trigger handle 54 is not limited to the example set forth in the preferred embodiment 10. The trigger handle 54 could extend in any number of directions according to user preference.

Among the many variations possible for the present invention are substitutions for the driving method of the blade subassembly 12. While the preferred embodiment 10 uses an electric motor 32, any number of method of providing rotational force could be used, including but not limited to, battery powered motors, pneumatic drive methods, or internal combustion engines. The power of the blade driving subassembly 14 being increased or decreased according to intended application.

The location and structure of the trigger switch 36 is open to variation as well, again according to user preference. Just a few of the many alternate schemes for the switch could be a foot switch or a switch located on the top handle subassembly 20. As mentioned previously, the trigger switch 36 could even be disposed on a vertically extending member similar to a jack hammer type operating handle. Yet another variation could be a long vertically disposed handle employed to cut into ceiling surfaces adjacent to walls. Such a variation would require an extended handle and a guide rail member for supporting and guiding the saw.

Variations in the outrigger subassembly 16 are also worth drawing attention to. The outrigger subassembly 16 need not be limited to an outrigger bar structure 114 and outrigger arms 116. Just a few possible examples include outrigger arms 116 that are integral extensions of the plate member 78, or outrigger arms 116 that swing outward from a position parallel to the rotational axis 60 to a position perpendicular to the rotational axis 60. The position locking method of the outrigger arms 116 could also be varied as long as the outrigger arms 116 are firmly secured in the outward position. In some applications is may be desirable to design the outrigger arms 116 to extend from the housing 30 instead of the floor plate subassembly 18.

The blade guard 22 design may also be varied according to the application of the present invention. If the saw assembly 10 is utilized to access areas too small to allow the floor plate subassembly 18 to pass through, the blade guard 22 may be alternately attached to the saw arm 52. The blade guard 22 can be designed to expose greater or lesser portions of the circular blade 66, or various other sides of the circular blade 66.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The preferred embodiment of the saw assembly 10 is intended to be widely used in the remodeling industry, predominantly for the removal of flooring. The main area of improvement of the saw assembly 10 is the ability to remove flooring portions under overhanging structures, eliminating the need to remove cabinets or the like, in order to access the flooring. A cut adjacent to a wall along nearly the entire wall length can be made a single pass.

The saw assembly of the present invention 10 provides a safer alternative as well. The previously described stability advantages provided by the outrigger subassembly 16, the floor plate subassembly 18, and the top handle subassembly 20, in addition to the safety features presented by the blade guard 22, carry the present invention a step beyond the prior art.

While ideally suited for sawing floors, the present invention is by no means limited to such applications. Problems presented by situations that require using a cutting implement in tight quarters can be solved by the present invention. The safety features can be varied to meet the environment. Alternate blade guard designs and outrigger subassemblies could be used to reduce or increase the size of the saw assembly, and orient the cutting portion of the circular blade to the desired location.

The preferred embodiment of the present invention 10 employs a side cutting and slitting blade, designed to cut steel, as the circular blade 66. It is noted that the inventors have found that blades not designed for side cutting are ineffective for flooring applications. In the preferred embodiment 10, an offset, parallel shaft grinder is used as the blade driving subassembly 14. The preferred materials of construction for the floor plate subassembly 18, outrigger subassembly 16, and blade guard 22 are stainless steel, cast aluminum, and hot or cold rolled steel or a high strength alloy, respectively. The drive shaft 34 of the preferred embodiment 10 rises to a vertical height of one to one and a half inches (2.54 cm–3.81 cm).

Since the saw assembly of the present invention 10 may be readily constructed it is expected that they will be acceptable in the industry to eliminate the considerable time and expense required to cut hard-to-access portions of flat surfaces, including flooring, walls and/or ceilings. In addition, it is anticipated that the blade driving subassembly 14 and blade subassembly 12 can be increased in size and power for demolition applications. For these and other reasons, it is expected that the utility and industrial applicability of the invention will be both significant in scope and long-lasting in duration.

What is claimed is:

1. A low profile edge cutting say, comprising:

a circular blade centrally disposed about a rotational axis and perpendicular to the rotational axis, said circular blade having an uppermost outer edge;

a drive shaft disposed along the rotational axis, said rive shaft having a blade end and a motor end, said drive shaft being attached to said circular blade at the blade end, said drive shaft further being of an extended length intermediate the blade end and the motor end, but extending a minimal amount beyond said circular blade;

motor means for providing rotational movement to said drive shaft, said motor means engaging the motor end of said drive shaft;

switch means for controlling power to said motor means; and a housing member including a central portion, and a front portion extending from the central portion, the central portion housing the motor means and having a flat bottom surface parallel to the rotational axis, the flat bottom surface defining a bottom plane, the central portion further having a first height relative to the bottom plane, the front portion being of an extended length and having a second height relative to the bottom plane, the second height being substantially lower than the first height and imparting to the front portion a substantially reduced height profile relative to the central portion thereby, said motor means adapted to position said drive shaft in close relation to the bottom plane, the front portion supportably holding said drive shaft in such close relation with the blade end of said drive shaft extending from the front portion, whereby said circular blade is also caused to have a lowered height profile relative to the central portion, the height profile of said circular blade being defined as the distance from the bottom plane to the uppermost outer edge of said circular blade, the extended length and close, parallel relation to the bottom plane of said drive shaft, and the lowered height profiles of the front portion and said circular blade, permitting relatively perpendicular cutting with respect to the bottom plane along vertical abutments within shallow confines.

2. The edge cutting saw of claim 1 wherein:

said housing member further includes a rear handle extending from the central portion, the rear handle housing said switch means; and said switch means is an index trigger switch depending downward from the rear handle.

3. The edge cutting saw of claim 1 wherein:

said housing member includes a top surface; and handle means that are removably locked to the top surface of said housing member.

4. The edge cutting saw of claim 1 further including:

a floor plate assembly including a rigid, flat plate portion having a from edge, a rear edge, and a flat ground engaging surface; and attachment means for securing the flat bottom surface of said housing member to said floor plate such that said circular blade extends beyond the front edge of said plate portion.

5. The edge cutting saw of claim 4 wherein:

said floor plate assembly further includes sliding means attached to the ground engaging surface.

6. The edge cutting saw of claim 4 further including:

an outrigger assembly including a plurality of outrigger arms, each outrigger arm having a ground engaging end and an outrigger attachment end, each attachment end being attached to said floor plate assembly, said housing member being disposed between the outrigger arms;

wherein the outrigger arms can be deployed in a stabilize position characterized by the flat ground engaging surface of said floor plate assembly engaging a floor surface, and each said outrigger arm being disposed such that the ground engaging ends contacting the floor surface.

7. The edge cutting saw of claim 6 wherein:

each outrigger arm is attached to the floor plate assembly by a lockable pivot.

8. The edge cutting saw of claim 1 further including:

a blade guard surrounding a portion of said circular blade and defining a covered blade portion and an exposed blade portion, the exposed blade portion extending below the bottom plane.

9. The low profile edge cutting saw of claim 1 wherein:

said motor means includes a gear assembly for translating rotational movement from a centrally disposed motor shaft to said drive shaft, the gear assembly providing for a radial offset of said shaft from the centrally disposed motor shaft.

* * * * *

UNITED STATES PATENT AND TRADEMARK OFFICE
CERTIFICATE OF CORRECTION

PATENT NO. : 5,651,182
DATED : July 29, 1997
INVENTOR(S) : KIM, Jack T.B., et al.

It is certified that error appears in the above-identified patent and that said Letters Patent is hereby corrected as shown below:

In the Abstract, line 7: Change "rest ting" to --rest ring--.

Column 5, line 7: Change "from" to --front--.

Column 9, line 35: Change "say" to --saw--.

Column 9, line 39: Change "rive" to --drive--.

Signed and Sealed this

Third Day of November, 1998

Attest:

BRUCE LEHMAN

Attesting Officer

Commissioner of Patents and Trademarks